(12) United States Patent
Wilkenhoener et al.

(10) Patent No.: US 8,858,701 B2
(45) Date of Patent: Oct. 14, 2014

(54) COMPOSITE PIGMENTS COMPRISING TITANIUM DIOXIDE AND CARBONATE AND METHOD FOR PRODUCING

(71) Applicants: Uwe Wilkenhoener, Wuppertal (DE); Frank Mersch, Leichlingen (DE)

(72) Inventors: Uwe Wilkenhoener, Wuppertal (DE); Frank Mersch, Leichlingen (DE)

(73) Assignee: Kronos International, Inc., Leverkusen (DE)

( * ) Notice: Subject to any disclaimer, the term of this patent is extended or adjusted under 35 U.S.C. 154(b) by 0 days.

(21) Appl. No.: 13/930,188

(22) Filed: Jun. 28, 2013

(65) Prior Publication Data

US 2014/0000484 A1    Jan. 2, 2014

Related U.S. Application Data

(60) Provisional application No. 61/677,168, filed on Jul. 30, 2012.

(30) Foreign Application Priority Data

Jun. 28, 2012  (DE) .......................... 10 2012 012 899
Jun. 5, 2013   (DE) .......................... 10 2013 009 635

(51) Int. Cl.
  *C09C 1/36*    (2006.01)
  *C09C 1/02*    (2006.01)
  *D21H 27/00*   (2006.01)
  *C09C 1/00*    (2006.01)
  *C09D 7/12*    (2006.01)

(52) U.S. Cl.
  CPC ........... *C09D 7/1216* (2013.01); *C01P 2006/64* (2013.01); *D21H 27/002* (2013.01); *C09C 1/3653* (2013.01); *C01P 2004/04* (2013.01); *C01P 2006/62* (2013.01); *C01P 2004/62* (2013.01); *C09C 1/0084* (2013.01)
  USPC ........... 106/449; 106/436; 106/442; 106/444; 106/447

(58) Field of Classification Search
  CPC .. C09D 7/1216; C09C 1/3653; C09C 1/0084; D21H 27/002; C01P 2004/04; C01P 2004/62; C01P 2006/62; C01P 2006/64
  USPC .......................... 106/436, 442, 444, 447, 449
  See application file for complete search history.

(56) References Cited

U.S. PATENT DOCUMENTS

| | | | | |
|---|---|---|---|---|
| 2,170,800 | A * | 8/1939 | Barton | 106/449 |
| 2,361,986 | A * | 11/1944 | Booge | 106/449 |
| 2,397,035 | A * | 3/1946 | Mowlds | 106/462 |
| 3,528,838 | A * | 9/1970 | Brixner | 106/449 |
| 3,832,206 | A * | 8/1974 | Libera et al. | 106/449 |
| 4,028,173 | A * | 6/1977 | Olson | 162/181.2 |
| 5,082,007 | A | 1/1992 | Adell | |
| 5,312,484 | A * | 5/1994 | Kaliski | 106/446 |
| 5,344,487 | A * | 9/1994 | Whalen-Shaw | 106/416 |
| 5,346,546 | A * | 9/1994 | Kaliski | 106/436 |
| 5,458,680 | A * | 10/1995 | Shurling et al. | 106/487 |
| 5,690,728 | A * | 11/1997 | Ravishankar | 106/416 |
| 5,755,870 | A * | 5/1998 | Ravishankar | 106/438 |
| 6,572,694 | B2 * | 6/2003 | Towe | 106/464 |
| 2003/0024437 | A1 | 2/2003 | Wen et al. | |

FOREIGN PATENT DOCUMENTS

| | | | | |
|---|---|---|---|---|
| EP | 0892019 | 1/1999 | | |
| EP | 0956316 | 11/1999 | | |
| JP | 2002-176131 A * | 6/2003 | ........... | C01G 23/047 |
| WO | WO 97/18268 | 5/1997 | | |
| WO | WO 97/32934 | 9/1997 | | |
| WO | WO 99/35193 | 7/1999 | | |
| WO | WO 00/01771 | 1/2000 | | |
| WO | WO00/78874 | 12/2000 | | |
| WO | WO00/78874 A1 * | 12/2000 | ............... | C09C 1/00 |
| WO | WO 2009/109705 | 9/2009 | | |
| WO | WO 2013/023018 | 2/2013 | | |

* cited by examiner

*Primary Examiner* — Anthony J Green
(74) *Attorney, Agent, or Firm* — Locke Lord LLP

(57) ABSTRACT

The invention relates to the manufacture of pigment-containing composite pigment particles containing titanium dioxide pigment particles and at least one inorganic and/or organic filler as extender, as well as calcium carbonate that is precipitated in the process, and their use for improving the pigment light-scattering efficiency in coatings, plastics and laminates. The extender is preferably selected from Ca-, Ca—Mg- and Mg-carbonates, natural and synthetic silicon dioxide and oxides and are manufactured in a combined process of precipitation and dispersion. Depending on the combination selected, the use of composite pigment particles according to the invention permits pigment savings with little or no loss of optical properties. Alternatively, if the pigment content remains unchanged, it is possible to achieve better values, e.g. for tinting strength. Particularly, a part or the whole $TiO_2$ quantity in the user system can be replaced by the composite pigment particles according to the invention.

21 Claims, 1 Drawing Sheet

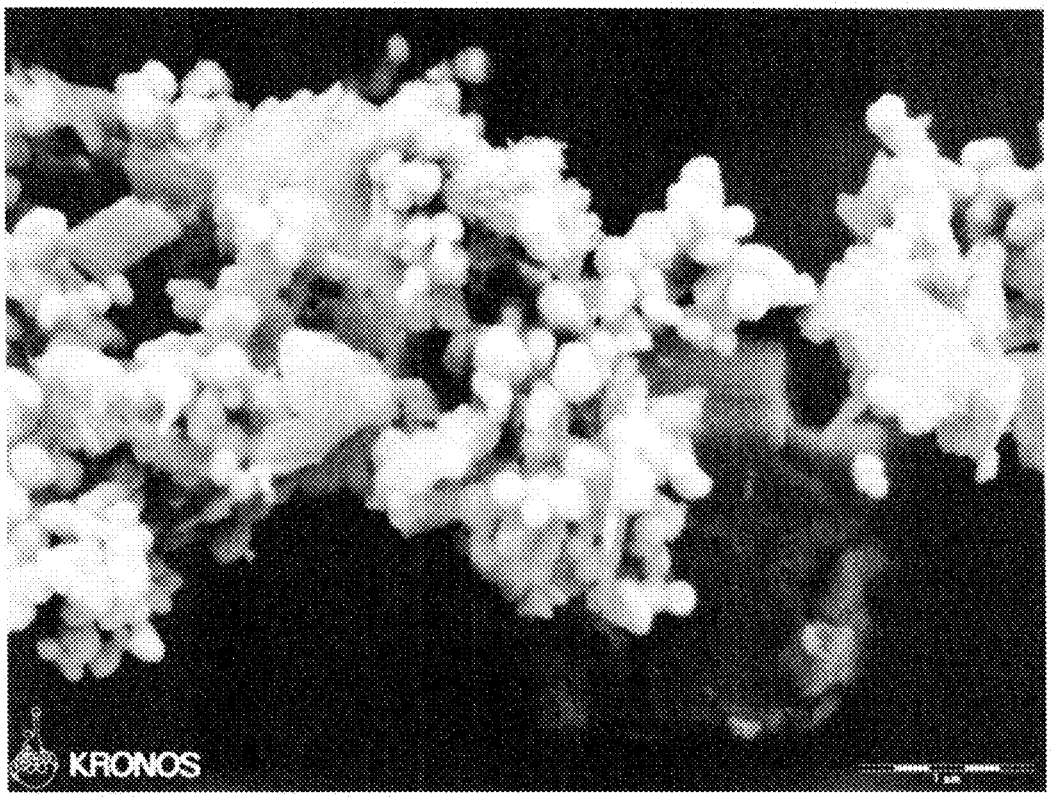

COMPOSITE PIGMENTS COMPRISING TITANIUM DIOXIDE AND CARBONATE AND METHOD FOR PRODUCING

RELATED APPLICATIONS

This application claims the benefit of U.S. Provisional Patent Application Ser. No. 61/677,168 filed Jul. 30, 2012, and entitled "Composite Pigments Comprising Titanium Dioxide and Carbonate and Method for Producing" and the benefit of DE 10 2012 012 899.1 filed Jun. 28, 2012 and DE 10 2013 009 635.9 filed Jun. 5, 2013.

BACKGROUND

1. Technical Field of the Invention

The invention relates to titanium dioxide- and carbonate-containing composite pigments, their manufacture and their use for improving the pigment light-scattering efficiency in coatings, plastics and laminates.

2. Description of Related Art

Inorganic pigments, and particularly titanium dioxide pigments, are often incorporated into various matrices as whiteners, tinting agents or opacifiers. Owing to its high refractive index, titanium dioxide scatters light particularly efficiently and is therefore the most important white pigment in the fields of application paint and coatings, plastics, paper and fibres. The light scattering efficiency decreases if the titanium dioxide particles dispersed in the matrix are spaced a smaller distance apart than roughly half the wavelength of the light, i.e. roughly 0.20 to 0.25 μm. The light scattering efficiency is typically measured with the help of the hiding power or the tinting strength (lightening power) of the titanium dioxide pigment in the matrix.

On the other hand, titanium dioxide is a significant cost factor, and a search has long since been in progress to find possible ways of reducing the quantity of titanium dioxide used, but without having to accept significant losses of hiding power. Savings can be achieved by combining titanium dioxide particles with suitable extenders, these extender particles being intended to act as spacers for the $TiO_2$ particles. The known methods encompass both simple blending of the components and combination of the $TiO_2$ particles with the extender particles by means of a precipitated binder, or in-situ precipitation of the extender on the surface of the titanium dioxide particles. Moreover, methods are known for dispersing the fine titanium dioxide particles on coarser extender particles.

Only selected documents from the available, extensive literature on the prior art are cited below.

WO 1999/035193 A1, for example, describes the manufacture of a pigment blend consisting of titanium dioxide and an inorganic extender ("spacer"), such as $SiO_2$ or $CaCO_3$, for use in paper production.

DE 10 057 294 C5 discloses a pigment blend consisting of titanium dioxide and talcum for use in base decorative laminating paper.

EP 0 861 299 B1 discloses a titanium dioxide pigment coated with inorganic nanoparticles, such as colloidal silica, as well as a layer of inorganic oxides, such as aluminium, silicon or zirconium oxide, where the inorganic oxide layer is either located between the titanium dioxide surface and the nanoparticles, or forms the outer coating. The inorganic nanoparticles are $SiO_2$, $Al_2O_3$ or $CaCO_3$.

DE 10 2006 012 564 A1 discloses titanium dioxide pigment particles with hollow microspheres and an aluminumoxide/aluminumphosphate coating on their surface.

In the method according to EP 0 956 316 B1, pigment particles and precipitated calcium carbonate (PCC) are mixed together in an aqueous phase, such that a composite pigment is obtained, in which the carbonate particles with a particle size of 30 to 100 nm are attached to the surface of the pigment particles. The composite pigment contains 30 to 90% by weight precipitated calcium carbonate.

WO 2009/109705 A1 discloses a composite pigment where the pigment particles are encased by intergrown nano particulate calcium carbonate particles.

DE 1 792 118 A1 discloses the in-situ precipitation of calcium carbonate in a titanium dioxide pigment suspension by mixing a calcium chloride and a sodium carbonate solution, where one of these solutions contains titanium dioxide pigment. This produces composite calcium carbonate/titanium dioxide particles.

WO 2000/001771 A1 discloses a composite pigment that contains inorganic particles with a particle size of roughly 1 to 10 μm, and to whose surface titanium dioxide pigment particles are attached as a result of opposite surface charges. Production is performed in an aqueous phase. The inorganic particles are selected from common extenders, such as kaolin, clay, talcum, mica or carbonates.

WO 2013/023018 A1 discloses a pigment blend consisting of carrier particles, pigment particles and colloidal spacer particles, whereby the spacer particles are located on the surface of the pigment particles and the pigment particles together with the spacer particles in turn are dispersed on the surface of the carrier particles.

BRIEF DESCRIPTION OF THE INVENTION

The object of the invention is to create an alternative composite pigment having a reduced titanium dioxide content, with which the same hiding power can be achieved in comparison with pure titanium dioxide, and a method for its manufacture.

The object is solved by a titanium dioxide- and carbonate-containing composite pigment, containing:
  Titanium dioxide particles,
  At least one inorganic and/or organic extender, and
  At least partially in-situ precipitated calcium carbonate in a quantity of less than 30% by weight, referred to composite pigment.

The object is furthermore solved by a method for manufacturing titanium dioxide- and carbonate-containing composite pigment particles by using the components titanium dioxide, at least one inorganic and/or organic extender as well as a soluble calcium source and a carbonate source as two reaction components, comprising the steps:
a) Provision of an aqueous suspension of titanium dioxide particles, extender particles and one of the reaction components,
b) Addition of the second reaction component and setting the pH value of the suspension to >8, preferably to >8.5,
c) Separation of the composite pigment particles from the suspension, where the quantity of calcium carbonate added in Step b) is less than 30% by weight, referred to composite pigment.

Further advantageous embodiments of the invention are indicated in the sub-claims.

BRIEF DESCRIPTION OF THE DRAWING

For a more complete understanding of the present invention and for further advantages thereof, reference is now made to the following description taken in conjunction with the accompanying drawings in which:

FIG. 1 shows a scanning electron microscope photograph of the composite pigment according to the invention, displaying a composition according to example 3.

DESCRIPTION OF THE PREFERRED EMBODIMENT

All data disclosed below regarding size in µm, etc., concentration in % by weight or % by volume, pH value, etc., are to be interpreted as including all values lying in the range of the respective measuring accuracy known to the person skilled in the art.

The composite pigment particles according to a preferred embodiment of the invention are characterized in that titanium dioxide pigment particles are homogeneously distributed on the surface of inorganic or organic extender particles, and in that, by means of in-situ precipitated calcium carbonate, a strong bond is created between the extender particles and the titanium dioxide pigment particles that cannot be broken during customary further processing by the user, e.g. dispersion in a dissolver or in an inline disperser.

The composite pigment particles according to the preferred embodiment of the invention differ from the corresponding composite particles or pigment blends in the prior art—especially from the compositions disclosed in WO 2009/109705 A1 and WO 2013/023018 A1—inasmuch that according to the preferred embodiment of the invention the in-situ precipitated calcium carbonate primarily creates the bond between extender particles and titanium dioxide particles and does not cover the surface of the titanium dioxide particles and does not function as a spacer for the titanium dioxide particles among each other (see FIG. 1).

In the context of the preferred embodiment of the invention, the term titanium dioxide particles or titanium dioxide pigment particles is taken to mean particles in the size range from roughly 100 nm to roughly 1 µm.

The composite pigment particles according to the preferred embodiment of the invention contain the pigment in almost ideally dispersed form and thus lead to an improvement in the efficiency of light scattering of the titanium dioxide pigment. This makes it possible to save that part of the pigment that is not ideally dispersed, but present in "flocculated" form. The composite pigment particles lead to improved hiding power in the user system when using the same quantity of pigment, or permit reduction of the pigment content in the user system, while maintaining the same hiding power.

The composite pigment particles according to the preferred embodiment of the invention are manufactured by using the components titanium dioxide, at least one inorganic and/or organic extender as well as a soluble calcium source and a carbonate source as two reaction components. Thereby an—especially well dispersed—aqueous suspension of titanium dioxide particles, inorganic and/or organic extender particles and one reaction component is prepared. The second reaction component is added to the suspension and the pH value is set to >8, preferably to >8.5. Finally, the composite particles are separated from the suspension. The quantity of the soluble calcium source added is less than 30% by weight, referred to the composite pigment.

In one embodiment of the invention the composite pigment particles can be manufactured by the following method: an aqueous suspension of titanium dioxide particles and calcium carbonate particles (as soluble calcium source) is prepared and set to an acidic pH value of less than 5, preferably less than 4.3, if necessary with an acid component, such that the calcium carbonate particles are completely dissolved, or at least more than 50% of them. An extender and a carbonate source are subsequently added, such that calcium carbonate is again precipitated and a bond created between the titanium dioxide particles, extender particles and calcium carbonate particles. Preferably the carbonate source is an alkaline carbonate, e.g. sodium carbonate.

Alternatively, instead of adding the alkaline carbonate compound, the pH value of the suspension can be set to more than 8, preferably more than 8.5 by adding an alkaline compound, after which carbon dioxide gas is introduced.

In principle, either surface-treated or untreated titanium dioxide pigment particles can be used. Untreated titanium dioxide base material particles are preferably used, particularly titanium dioxide base material particles from the chloride process. The titanium dioxide pigment particles may be doped, preferably Al-doped. In economic terms, it is particularly advantageous to use non-sand-milled and non-dechlorinated titanium dioxide base material particles manufactured by the chloride process. Alternatively, it is also possible to use sand-milled and dechlorinated titanium dioxide base material particles manufactured by the chloride process.

As soluble calcium source e.g. calcium salts like calcium chloride, calcium nitrate or calcium hydroxide can be used. Furthermore, a commercially customary variety of calcium carbonate familiar to the person skilled in the art can be used as the calcium carbonate component. The calcium carbonate used advantageously has a high degree of whiteness. The particle size is a maximum of roughly 100 µm, preferably 1 to 40 µm, and particularly 1 to 20 µm. Natural calcium carbonate in the form of chalk or marble dust is preferably used.

As the acid component, e.g. inorganic acids, such as hydrochloric acid or nitric acid can be used. Moreover suitable are acid-reacting salts whose cations do not impair the structure and later use of the composite pigment particles in user systems. It is particularly advantageous to use acid-reacting compounds occurring in the framework of titanium dioxide production, such as titanyl chloride (titanium oxychloride), as well as hydrochloric acid or hypochlorous acid, which are obtained in the chloride process owing to the nature of the process. For example, the acids occur in the chloride process as a result of dissolution of the chlorine gas during transfer of the pigment to the aqueous phase.

The sequence for preparing the acidic suspension of titanium dioxide and soluble calcium source—e.g. calcium carbonate—is variable. For example, it is possible to first prepare an aqueous suspension of titanium dioxide and calcium carbonate particles, which has a roughly neutral pH value, and only then to add the acid component. Alternatively, non-dechlorinated titanium dioxide base material suspension from the chloride process can be used, it generally having a pH value in the region of 2.5 to 4. After adding calcium carbonate, the pH value is, if appropriate, set to a value of <5, preferably <4.3, by adding a further acid component. Experience shows that calcium carbonate is dissolved at a pH value <5. In a further embodiment of the invention e.g. calcium chloride, calcium nitrate or calcium hydroxide can be added as soluble calcium source to the titanium dioxide suspension and subsequently, the pH value of the suspension can be set to <5, preferably to <4.3 by adding an acid component if necessary.

The extenders open to consideration are, in principle, all commercial inorganic extenders and their blends, familiar to the person skilled in the art. Suitable inorganic extenders are e.g. natural or precipitated calcium or calcium-magnesium or magnesium carbonates like marble dust, chalk, precipitated calcium carbonate (PCC), dolomite, huntite, hydromagnesite or magnesite. In this context "carbonates" comprise also carbonates with hydroxide groups and/or with water of crystallization. Further suitable extenders are sulphates like barium sulphate or calcium sulphate, natural phosphates, hydroxides like magnesium hydroxide, aluminumhydroxide or -oxyhydrate and oxides like silicium oxide in natural, milled, pyrogenic or precipitated form like quartz powder, diatomaceous earth etc. Further suitable extenders are e.g. silicates and alumosilicates like talcum, zeolites, kaolin, wollastonite, mica, uncalcined or calcined clay minerals. Further suitable extenders are e.g. perlite or glass powder.

In addition, inorganic or organic fibers can be used as extender. Furthermore, organic extenders are suitable like e.g. Ropaque from Messrs. Rohm and Haas. White extenders are preferably used. Particularly preferred are Ca—Mg- or Mg- carbonates, such as dolomite, huntite, hydromagnesite or magnesite. The extender particles generally have a particle size in excess of 1 μm. Particle sizes of at least 1 to 30 μm, preferably 2 to 10 μm, are suitable.

Attention must subsequently be paid to intensive agitation or dispersion of the mixture. In this context, use is preferably made of dispersing equipment familiar to the person skilled in the art, such as dissolvers, or also various types of inline disperser. The intensity and duration of dispersion varies, depending on the extenders and pigments used, and corresponds to the settings that are also used in the production of emulsion paints. Processes of this kind are familiar to the person skilled in the art.

An alkaline carbonate compound, e.g. sodium carbonate, is subsequently added to the suspension. The quantity of alkaline carbonate compound added is selected in such a way that the dissolved calcium carbonate is precipitated again and the pH value of the suspension rises to >8, preferably to >8.5.

Alternatively, instead of adding the alkaline carbonate compound, the pH value of the suspension can be set to more than 8, preferably to >8.5 by adding an alkaline compound, after which carbon dioxide gas is introduced, whereupon calcium carbonate is precipitated. As described above, attention must again be paid to intensive, thorough mixing of the suspension during precipitation.

Finally, the composite pigment particles are separated from the suspension by filtration, washed and dried.

According to a second embodiment of the invention the composite pigment particles are manufactured in the following way: An alkaline carbonate compound, e.g. sodium carbonate is added as the first reaction component to an aqueous suspension of titanium dioxide which may display an alkaline pH value. Subsequently at least one inorganic and/or organic extender is added to the suspension. Suitable extenders are listed above. Subsequently a soluble calcium source is added as second reaction component and if necessary an alkaline compound is added such that it results in a pH value of >8, preferably >8.5. Suitable calcium sources are e.g. $CaCl_2$, $Ca(NO_3)_2$ or $Ca(OH)_2$. Alternatively, a soluble calcium source can be used as first reaction component, e.g. $CaCl_2$, $Ca(NO_3)_2$ or $Ca(OH)_2$, whereby the pH value of the suspension is set to >8, preferably >8.5. In that case, a carbonate source in form of an alkaline carbonate compound or in form of $CO_2$ gas together with an alkaline compound would be added as second reaction component.

As described above, attention must again be paid to intensive, thorough mixing of the suspension during precipitation.

Finally, the composite pigment particles are separated from the suspension by filtration, washed and dried.

According to the preferred embodiment of the invention, the quantity of calcium carbonate added is less than 30% by weight, preferably 10 to 25% by weight, referred to composite pigment particles. The composite pigment particles preferably contain a maximum of 70% by weight $TiO_2$, particularly a maximum of 50% by weight $TiO_2$, and particularly preferably a maximum of 30% by weight $TiO_2$.

The effectiveness of the titanium dioxide can be optimized, depending on the required quality of the paint or coating manufactured using the composite pigment particles. Savings on pigment, achieved through its more effective utilization in the composite pigment particle, yield an economic advantage in comparison with the separate use of extender and pigment. Use of the composite pigment particles manufactured according to the preferred embodiment of the invention in the user system permits pigment savings of up to 30%, preferably 15 to 30%, the optical properties otherwise remaining unchanged.

The $TiO_2$ required in the user system may be added either as a combination of the composite pigment according to the preferred embodiment of the invention and pure $TiO_2$ or as a full replacement only in the form of the composite pigment according to the preferred embodiment of the invention.

Another advantage is that the $TiO_2$ is already well distributed on the composite pigment particle, meaning that energy for dispersion in the paint system can be saved. The coarser extender and composite pigment particles require less dispersing and milling energy, and smaller quantities of dispersants. Use of the composites thus results in a further advantage for the paint manufacturer.

In a further embodiment of the method according to the invention the composite pigment particles additionally can be treated with phosphoric acid or sodium silicate resulting in an improved acid stability.

Furthermore, it is possible to treat the composite pigment particles according to the preferred embodiment of the invention with those inorganic compounds which are typically used during the manufacture of TiO2. The person skilled in the art is familiar with the relevant compounds and procedures.

In a special embodiment of the method according to the invention, organic additives can additionally be added to the mixing equipment, preferably in a quantity of 0.05 to 30% by weight, preferably 0.5 to 10% by weight, referred to the pigment/extender blend. The organic additives can be added both in solid and in liquid form. Suitable as organic additives are, on the one hand, commercially available, wax-like additives, with or without further chemical functionalization. On the other hand, familiar dispersing additives or other auxiliaries customary in paint technology, e.g. for rheological purposes, defoaming, wetting, etc., are also suitable.

The composite pigment particles according to the invention are particularly suitable for use in interior and exterior emulsion paints, as well as in other water-borne paint systems. They can furthermore be used in plastics and laminates.

EXAMPLES

The invention is described in more detail on the basis of the following examples, this not being intended to restrict the scope of the invention.

The following components were used to manufacture the composite pigment particles:
Pigment: Unmilled, non-dechlorinated titanium dioxide base material from the chloride process
Extender 1: Ultracarb 1250 from Minelco (huntite/hydromagnesite blend)
Extender 2: Omyacarb 5GU from Omya (calcium carbonate)
Additive: Calgon N (sodium hexametaphosphate)

The pure titanium dioxide pigments KRONOS 2190 and KRONOS 2310 were used as reference examples.

The composite pigment particles had the following composition (in parts by mass):

|  | Pigment | Extender 1 | Extender 2 | Additive |
|---|---|---|---|---|
| Example 1 | 30 | 60 | 10 | 0.5 |
| Example 2 | 30 | 50 | 20 | 0.5 |
| Example 3 | 30 | 40 | 30 | 0.5 |
| Reference examples | 100 | | | |

The composite pigment particles according to the invention (Examples 1, 2, 3) were prepared as follows:

425 g of an aqueous suspension of unmilled, non-dechlorinated titanium dioxide base material particles with a solids concentration of 42.3% by weight $TiO_2$ and a pH value of 3.7 were put into a suitable vessel. 180 g Omyacarb 5GU (calcium carbonate) and 150 g water were subsequently added while stirring. This suspension was set to a pH value of roughly 4.3 by slowly adding a total of 430 ml HCl (25%) and then stirred for approx. 30 minutes at this pH value. This was followed by addition of the additive (0.5% by weight, referred to total solids, including all extenders). 240 g Ultracarb 1250 (huntite/hydromagnesite blend) were subsequently added to this suspension while stirring intensively, this being followed by dispersion for approx. 30 minutes at approx. 4,000 rpm, using a suitable saw-toothed disc. Following dispersion, 1,050 ml of a 20% sodium carbonate solution were added at a pH value of approx. 8.5 while stirring, the calcium carbonate being precipitated out again. The suspension was subsequently filtered, washed with approx. 5 l fully demineralized water and dried in the drying oven at 120° C. for approx. 16 h.

FIG. 1 shows a scanning electron microscope photograph of the composite pigment according to the invention with the composition of Example 3. The isometric particles are titanium dioxide, the plate-like particles of different sizes are the extender, and the fine crystal aggregates are precipitated calcium carbonate.

The composite pigment particles and the commercial $TiO_2$ pigments KRONOS 2190 (Reference example 1) and KRONOS 2310 (Reference example 2) were tested for their brightness (PLV L*) and yellow tone (PLV b*). The test results are compiled in Table 1.

TABLE 1

Optical properties of the composite pigment particles according to the invention

|  | PLV (L* value) | PLV (b* value) |
|---|---|---|
| Example 1 | 98.4 | 0.84 |
| Example 2 | 98.5 | 1.07 |
| Example 3 | 98.5 | 1.10 |
| Reference example 1 | 98.0 | 1.13 |
| Reference example 2 | 98.7 | 0.43 |

The composite pigment particles were subsequently incorporated into an interior emulsion paint having the formulation indicated in Table 2, where 20% by weight of the $TiO_2$ pigment (referred to $TiO_2$ pigment) was in each case replaced by the composite pigment particles according to the invention. The interior emulsion paint has a pigment volume concentration (PVC) of 78%.

For comparison, the interior emulsion paint was also produced using the commercial $TiO_2$ pigment KRONOS 2190 (Reference example 1) and using the commercial $TiO_2$ pigment KRONOS 2310 (Reference example 2).

TABLE 2

Formulation of the white interior emulsion paint (test paint)

| Water | 27.45% by weight |
|---|---|
| Calgon N neu (dispersant) | 0.05% by weight |
| Dispex N 40 (dispersant) | 0.30% by weight |
| Agitan 315 (defoamer) | 0.20% by weight |
| Acticid MBS (algicide/fungicide) | 0.40% by weight |
| $TiO_2$ pigment (KRONOS 2190) | 22.00% by weight |
| Steamat (extender) | 7.00% by weight |
| Socal $P_2$ (extender) | 2.00% by weight |
| Omyacarb 2-GU (extender) | 11.80% by weight |
| Omyacarb 5-GU (extender) | 15.50% by weight |
| Celite 281 SS (extender) | 2.00% by weight |
| Tylose MH 30000 YG8 (cellulose) | 0.30% by weight |
| Mowilith LDM 1871 (binder) | 11.00% by weight |

The test paint was tested for its contrast ratio (CR). The test results are compiled in Table 3.

TABLE 3

White interior emulsion paint

|  | Contrast ratio (mean 80-125 μm) | $TiO_2$ pigment content [% by weight] |
|---|---|---|
| Example 1 | 97.6 | 17.6 |
| Example 2 | 97.5 | 17.6 |
| Example 3 | 97.2 | 17.6 |
| Reference example 1 | 97.6 | 22.0 |
| Reference example 2 | 96.8 | 22.0 |

Test Methods

The brightness (L*) and tone (b*) of the composite pigment particles and the pure pigments were determined on a corresponding powder tablet (PLV test) using a HUNTERLAB tristimulus colorimeter in accordance with the following specification: The pigment powder is milled prior to preparing the tablet. To this end, 100 g powder are put into a commercially available mixer (manufacturer: Braun; model: MX 2050) and ground for 5 seconds 12 times. The mixer is opened after each grinding step and the powder thoroughly mixed again. To prepare the powder tablet, a sheet of white paper, matt on both sides, is placed on a base plate with a circular recess, and a metal ring (height 4 cm, diameter 2.4 cm) is pressed into the recess using the press. Roughly 25 g of the ground powder are put into the metal ring, shaking and tapping it gently. The powder is compacted by applying a pressure of 2-3 kN. The pressing operation is performed a second time until the targeted operating pressure of 15 kN is reached. The metal ring is separated from the base plate by careful twisting and pulling. The paper between the base plate and the ring is removed. The ring now holds the pressed tablet used for measuring on the HUNTERLAB colorimeter. The measured values of L* and b* are ready off directly on the colorimeter.

To determine the contrast ratio, the white interior emulsion paint (test paint) produced in accordance with the specified formulation was applied to Morest charts with grooved doctor blades (80-125 μm) by means of an automatic film applicator at a speed of 12.5 mm/s. The Y over black background ($Y_{(black)}$) and Y over white background ($Y_{(white)}$) colour values were then measured three times each with the Color-view spectrophotometer. The contrast ratio was calculated according to the following formula:

$$CR\ [\%] = Y_{(black)}/Y_{(white)} \times 100$$

Depending on the combination selected, the use of composite pigment particles according to the invention, consisting of extender and titanium dioxide pigment, permits pigment savings with little or no loss of optical properties. Alternatively, if the pigment content remains unchanged, it is also possible to achieve better values, particularly for tinting strength.

The above descriptions of certain embodiments are made for the purpose of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventor is legally entitled.

What is claimed is:

1. A composite pigment, comprising:
   titanium dioxide particles;
   at least one coarse inorganic and/or organic extender;
   a binder of in situ precipitated calcium carbonate formed of fine crystal aggregates that bonds the titanium dioxide and the extender and does not cover the surface of the titanium dioxide particles;
   wherein the binder is present in a quantity of less than 30% by weight, referred to composite pigment.

2. The composite pigment of claim 1, wherein the titanium dioxide particles are surface-treated particles.

3. The composite pigment of claim 1, wherein the titanium dioxide particles are untreated titanium dioxide pigment particles.

4. The composite pigment of claim 1, wherein the inorganic extender is selected from the group consisting of calcium carbonate, calcium-magnesium carbonates, magnesium carbonates, sulphates, natural phosphates, oxides, hydroxides, silicon oxide, silicates, alumosilicates, perlite, glass powder, and mixtures thereof.

5. The composite pigment of claim 4, wherein the inorganic extender is selected from the group consisting of dolomite, huntite, hydromagnesite, magnesite, and mixtures thereof.

6. The composite pigment of claim 1, wherein the composite pigment particles are treated with phosphoric acid or sodium silicate.

7. A method for manufacturing composite pigment particles comprising the steps of:
   a) providing a soluble calcium source and a carbonate source as two reaction components;
   b) providing an aqueous suspension of particles of titanium dioxide, particles of at least one coarse inorganic and/or organic extender and one of the reaction components;
   c) Adding the second reaction component and setting the pH value of the suspension to greater than about 8 to form a composite pigment particle where the extender is bonded to the titanium dioxide by an in situ precipitated calcium carbonate binder of fine crystal aggregates that does not cover the surface of the titanium dioxide particles and is formed from the two reaction components;
   d) Separating the composite pigment particles from the suspension;
   wherein the quantity of calcium carbonate binder added is less than 30% by weight, referred to composite pigment.

8. The method of claim 7 wherein the pH value of the suspension in step c) is set to is greater than about 8.5.

9. The method according to claim 7, wherein
   step b) comprises the steps:
      providing an aqueous suspension of titanium dioxide particles;
      adding a calcium carbonate and if necessary at least one acid reacting compound;
      whereby a pH value of less than about 5 is obtained in the suspension;
      adding the at least one extender; and
   wherein in Step c) a carbonate source is added.

10. The method of claim 9 wherein a pH value less than about 4.3 is obtained in the suspension in step b).

11. The method of claim 7 wherein $CaCl_2$, $Ca(NO_3)_2$ or $Ca(OH)_2$ is used as soluble calcium source.

12. The method of claim 7 wherein in step b) $CaCO_3$ is used as soluble calcium source and the pH value of the suspension is set to less than about 5.

13. The method of claim 12 wherein in the pH value of the suspension is set to less than about 4.3.

14. The method of claim 7 wherein the carbonate source is an alkaline carbonate compound or carbon dioxide gas together with an alkaline compound.

15. The method of claim 7 wherein the titanium dioxide particles are surface-treated titanium dioxide particles.

16. The method of claim 7 wherein the titanium dioxide particles are untreated titanium dioxide pigment particles.

17. The method of claim 7 wherein the extender is an inorganic extender selected from the group consisting of calcium carbonate, calcium-magnesium carbonates, magnesium carbonates, sulphates, natural phosphates, oxides, hydroxides, silicon oxide, silicates, alumosilicates, perlite, glass powder, and mixtures thereof.

18. The method of claim 15 wherein the extender is an inorganic extender selected from the group consisting of dolomite, huntite, hydromagnesite, magnesite, and mixtures thereof.

19. The method of claim 9 wherein the acid-reacting compound is selected from the group consisting of hydrochloric acid, nitric acid, aluminum sulphate, aluminum chloride, titanyl chloride, and hydrochloric acid and hypochlorous acid.

20. The method of claim 7 further comprising the step of treating the composite pigment particles with phosphoric acid or sodium silicate.

21. The method of claim 7 further comprising the step of utilizing the resulting composite pigment particles in laminates, coatings or polymers.

* * * * *